(12) United States Patent
Zhang et al.

(10) Patent No.: US 11,909,812 B2
(45) Date of Patent: *Feb. 20, 2024

(54) APPLICATION CONTROL METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Wei Zhang, Shenzhen (CN); Jie Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,090

(22) Filed: Jun. 20, 2023

(65) Prior Publication Data

US 2023/0336619 A1 Oct. 19, 2023

Related U.S. Application Data

(63) Continuation of application No. 17/974,454, filed on Oct. 26, 2022, now Pat. No. 11,722,555, which is a (Continued)

(30) Foreign Application Priority Data

Jan. 4, 2021 (CN) .......................... 202110000662.9

(51) Int. Cl.
*H04L 67/10* (2022.01)

(52) U.S. Cl.
CPC .................................. *H04L 67/10* (2013.01)

(58) Field of Classification Search
None
See application file for complete search history.

(56) References Cited

U.S. PATENT DOCUMENTS 7,136,857 B2 * 11/2006 Chen ....................... H04L 67/56
707/999.102
7,685,183 B2 * 3/2010 Pace ..................... H04L 63/101
707/633

(Continued)

FOREIGN PATENT DOCUMENTS

CN 104636139 A 5/2015
CN 108255546 A 7/2018
(Continued)

OTHER PUBLICATIONS

Tencent Technology, ISR, PCT/CN2022/070027, Apr. 2, 2022, 3 pgs.

(Continued)

*Primary Examiner* — Quang N Nguyen
(74) *Attorney, Agent, or Firm* — Morgan, Lewis & Bockius LLP

(57) ABSTRACT

This application relates to an application control method performed by an electronic device that runs a native application and a sub-application nested in the native application. The method includes: receiving, by the native application, an object creation instruction transmitted by the sub-application; in response to the object creation instruction, creating, by the native application, a native object, wherein the native object is configured for performing operation on target multimedia content in the sub-application; receiving, by the native application, an object calling instruction transmitted by the sub-application; and in response to the object calling instruction, executing, by the native application, the native object and returning an execution result of the native project to the sub-application, wherein the sub-application is configured for performing corresponding operation on target multimedia content according to the execution result.

17 Claims, 10 Drawing Sheets

Related U.S. Application Data continuation of application No. PCT/CN2022/070027, filed on Jan. 4, 2022.

(56) References Cited

U.S. PATENT DOCUMENTS

| | | | |
|---|---|---|---|
| 9,170,808 B2* | 10/2015 | Sethi | G06F 8/61 |
| 9,497,606 B1 | 11/2016 | Brewer | |
| 10,997,242 B2* | 5/2021 | Sherman | G06F 8/30 |
| 11,372,655 B2* | 6/2022 | Garstenauer | G06T 19/006 |
| 11,722,555 B2 | 8/2023 | Zhang et al. | |
| 2002/0100038 A1 | 7/2002 | Balassanian | |
| 2018/0232456 A1* | 8/2018 | Sherman | H04L 41/0246 |
| 2019/0220304 A1 | 7/2019 | Hu et al. | |
| 2019/0220332 A1 | 7/2019 | Wu et al. | |
| 2019/0266034 A1 | 8/2019 | Wang et al. | |
| 2020/0233681 A1* | 7/2020 | Garstenauer | H04L 12/1827 |
| 2020/0278949 A1 | 9/2020 | Wang | |
| 2021/0243603 A1 | 8/2021 | Yin et al. | |
| 2022/0244930 A1 | 8/2022 | Lei et al. | |
| 2022/0345490 A1 | 10/2022 | Wu et al. | |
| 2023/0014732 A1 | 1/2023 | Zhang | |
| 2023/0059097 A1 | 2/2023 | Zhang et al. | |

FOREIGN PATENT DOCUMENTS

| | | |
|---|---|---|
| CN | 109032691 A | 12/2018 |
| CN | 110401878 A | 11/2019 |
| CN | 111208997 A | 5/2020 |
| CN | 111367635 A | 7/2020 |
| CN | 112331235 A | 2/2021 |

OTHER PUBLICATIONS

Tencent Technology, WO, PCT/CN2022/070027, Apr. 2, 2022, 4 pgs.

Tencent Technology, IPRP, PCT/CN2022/070027, Jul. 4, 2023, 5 pgs.

* cited by examiner

APPLICATION CONTROL METHOD AND APPARATUS, ELECTRONIC DEVICE, AND STORAGE MEDIUM

CROSS-REFERENCE TO RELATED APPLICATIONS

This application is a continuation application of U.S. patent application Ser. No. 17/974,454, entitled "APPLICATION CONTROL METHOD AND APPARATUS, ELECTRONIC DEVICE, AND STORAGE MEDIUM" filed on Oct. 26, 2022, which is a continuation application of PCT Patent Application No. PCT/CN2022/070027, entitled "APPLICATION PROGRAM CONTROL METHOD AND APPARATUS, ELECTRONIC DEVICE, AND STORAGE MEDIUM" filed on Jan. 4, 2022, which claims priority to Chinese Patent Application No. 202110000662.9, filed with the State Intellectual Property Office of the People's Republic of China on Jan. 4, 2021, and entitled "EDITING CONTROL METHOD AND APPARATUS FOR MULTIMEDIA CONTENT, ELECTRONIC DEVICE, AND STORAGE MEDIUM", all of which are incorporated herein by reference in their entirety.

FIELD OF THE TECHNOLOGY

This application relates to the field of computer technologies, and in particular, to an application control method and apparatus, an electronic device, and a storage medium.

BACKGROUND OF THE DISCLOSURE

With the development of communication technology and the popularization of intelligent terminals, sub-applications as light applications have become an important form of mobile Internet applications, for example, users can handle various services or perform social activities and the like through the sub-applications based on native applications. The native applications can be social applications like instant messaging software, tool applications like picture modification software and office software, audio-video entertainment applications like short video software and game software, content publishing applications like third-party consumption comment software, content information applications like browsers and news software, and system applications like vehicle-mounted applications. The sub-applications can be used without downloading and installing and cannot occupy the storage space of the electronic device, and therefore the sub-applications are widely accepted by the users.

In related technologies, the audio and video capability of the sub-applications can only be realized through a third-party audio and video editing library. However, introducing of the third-party audio and video editing library into the webpage side will cause large volume of a front-end application package, and the sub-applications generally limit the volume of the package.

SUMMARY

An embodiment of this application provides an application control method and apparatus, an electronic device, and a storage medium, aiming at providing multimedia content editing capability for sub-applications without increasing the volume of an application package.

A first type of application control method provided by the embodiment of this application is performed by the electronic device and includes:
  running a native application and a sub-application nested in the native application in the electronic device;
  transmitting an object creation instruction to the native application in response to detecting an operation request for a target multimedia content by the sub-application, the object creation instruction including parameter information corresponding to a native object to be created and enabling the native application to create the native object according to the parameter information, and the native object being used for performing operation on the target multimedia content in the sub-application;
  transmitting the object calling instruction to the native application in response to determining the native object created by the native application so as to enable the native application to call the native object and execute a function code of the native object; and
  receiving an execution result returned by the native application, and performing corresponding operation on the target multimedia content according to the execution result.

A second type of application control method provided by the embodiment of this application is performed by the electronic device and includes:
  running the native application and the sub-application nested in the native application in the electronic device;
  creating the native object according to the parameter information corresponding to the native object to be created in the object creation instruction after receiving the object creation instruction transmitted by the sub-application, the object creation instruction being transmitted during the sub-application detects the operation request for the target multimedia content, and the native object being used for performing operation on the target multimedia content in the sub-application;
  calling the native object after receiving the object calling instruction transmitted by the sub-application, and executing the function code of the native object, the object calling instruction being transmitted during the sub-application determines that the native object is created by the native application; and
  returning the execution result to the sub-application, and performing corresponding operation on the target multimedia content through the sub-application according to the execution result.

A first type of application control apparatus provided by the embodiment of this application includes:
  a running unit for running the native application and the sub-application nested in the native application in the electronic device;
  a first transmission unit for transmitting the object creation instruction to the native application when the sub-application detects the operation request for the target multimedia content, the object creation instruction including the parameter information corresponding to the native object to be created and enabling the native application to create the native object according to the parameter information, and the native object being used for performing operation on the target multimedia content in the sub-application;
  a second transmission unit for transmitting the object calling instruction to the native application in response to determining the native object created by the native application so as to enable the native application to call the native object and execute the function code of the native object; and a control unit for receiving an execution result returned by the native application, and performing corresponding operation on the target multimedia content according to the execution result.

A second type of application control apparatus provided by the embodiment of this application includes:

a running unit for running the native application and the sub-application nested in the native application in the electronic device;

an object creating unit for creating the native object according to the parameter information corresponding to the native object to be created in the object creation instruction after receiving the object creation instruction transmitted by the sub-application, the object creation instruction being transmitted during the sub-application detects the operation request for the target multimedia content, and the native object being used for performing operation on the target multimedia content in the sub-application;

an object calling unit for calling the native object after receiving the object calling instruction transmitted by the sub-application, and executing the function code of the native object, the object calling instruction being transmitted during the sub-application determines that the native object is created by the native application; and a first feedback unit for returning the execution result to the sub-application, and performing corresponding operation on the target multimedia content through the sub-application according to the execution result.

Embodiments of this application provide an electronic device, including a processor and a memory, the memory storing program code, the program code, when executed by the processor, causing the processor to perform the operations of any one of the foregoing application control methods.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the operations of any one of the foregoing application control methods.

An embodiment of this application provides a computer-readable storage medium, including program code, the program code, when run on an electronic device, being configured to cause the electronic device to perform the operations of any one of the foregoing application control methods.

The embodiments of this application provide an application control method and apparatus, an electronic device, and a storage medium. Specifically, when the operation is performed on the target multimedia content through the sub-application, the object creation instruction is transmitted to the native application, and the object calling instruction is transmitted to the native object after determining the native object created by the native application, wherein the native object is an object used for performing operation on the multimedia content, and therefore the operation on the target multimedia content can be achieved by calling the native object and executing corresponding function codes. Due to the fact that the capacity of a native system is combined in the embodiment of this application, through the interaction between the sub-application and the native application, the sub-application can gain the basic multimedia content editing capability without depending on a third-party operation function library such as a third-party audio and video editing library, and the package volume of the sub-application cannot be increased.

Other features and advantages of this application will be described in the subsequent specification, and partially become apparent from the specification, or be understood by implementing this application. Objectives and other advantages of this application may be implemented and obtained by using structures particularly mentioned in the specification, the claims, and the accompanying drawings.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In FIGS.

DESCRIPTION OF EMBODIMENTS

Figure 1:
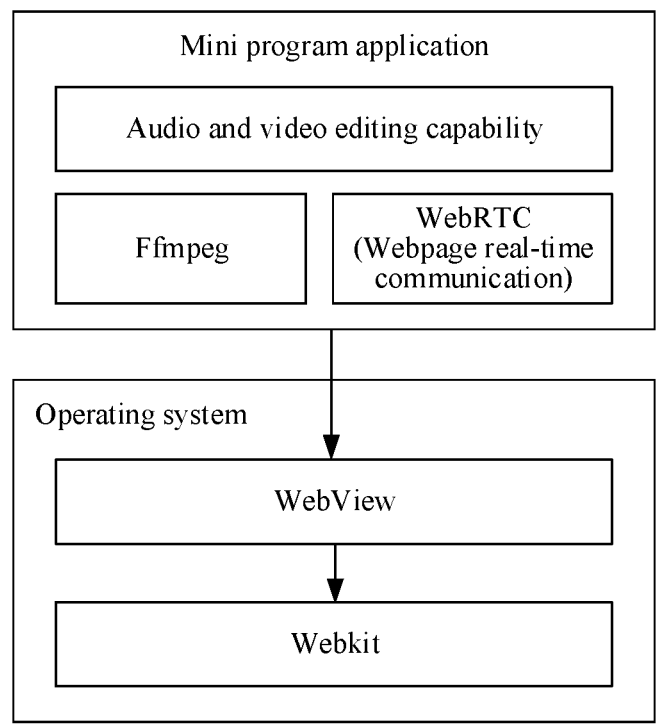
FIG. 1 is a schematic diagram of introducing a third-party audio and video editing library into a mini program in related art.

To make the objectives, technical solutions, and advantages of the embodiments of this application clearer, the technical solutions in this application will be clearly and completely described in the following with reference to the accompanying drawings in the embodiments of this application. Apparently, the described embodiments are merely a part rather than all of the embodiments of the technical solutions of this application. All other embodiments obtained by a person of ordinary skill in the art based on the embodiments recorded in the document of this application without creative efforts shall fall within the protection scope of the technical solutions of this application.

The following describes some concepts involved in the embodiments of this application.

Native application: the native application is also called as a "main application" and is opposite to a network application, and the native application is installed on a terminal device and can use hardware functions of the terminal device (such as a loudspeaker, an acceleration sensor and a camera). The native application can be downloaded from an application market. A sub-application and the native application in the embodiment of this application have a nested relationship, and the sub-application is nested in the native application.

Sub-application: the sub-application refers to an application developed based on a framework of the native application, and has an own life cycle and a basic interface. A user can obtain the sub-application through an URL address in the native application after installing and running the native application, instead of downloading and installing the sub-application from the application market. For example, in the native application, the user scans a two-dimensional code of the sub-application to obtain the URL address of the sub-application from the two-dimensional code and then downloads from this address to obtain the sub-application; or, the user directly searches the sub-application in the native application, obtains the URL address and downloads it from this address. For example, the sub-application is a mini program running based on the native application and can bear specific functions under the native application. For example, in the native application "Wesee", red packets can be added for a video through the mini program; for example, in the native application "Meitu", basic picture editing can be performed through the mini program; and for another example, in the native application "DianPing", the video can be uploaded for publishing an evaluation through the mini program.

DOM (Document Object Model): it is a standard programming interface for processing an extensible markup language. On a webpage, objects of an organization page (or document) are organized in a tree structure to be used for representing a standard model of the objects in the document, and the standard model is called DOM.

Objects and classes: the objects are variables with reference types of classes. The classes and the objects are the most basic concepts in the object-oriented programming technology. The objects with the same attribute are called classes.

Native Object: the native object can also be called a local object or an internal object and is a data structure dynamically created in the running process of the native application, and the data structure includes elements such as a class name, a method name and parameters.

Dictionary: the dictionary is a data structure for storing data in a key-value pair mode, for example, name-telephone number, namely, the corresponding telephone number can be found through the name, the name is the key, and the telephone number is the value. The key in the dictionary is an index of the value in the dictionary. For JavaScript, the basis of the Dictionary class is the Array class, and the Array in JS is an array and is also a dictionary. In the embodiment of this application, the native application can store all created native objects based on the global data dictionary so as to keep the calling of the sub-application to the native object.

Plug-in: the plug-in is a program compiled by Application Interfaces (API) conforming to a certain specification. The plug-in the embodiment of this application is mainly an audio and video plug-in provided on a native application side, and the plug-ins contain a large number of APIs through which the sub-applications can be flexibly combined and design audio and video editing capability with rich functions.

Same-layer rendering: it refers to that a native component is directly rendered to a WebView (webpage view) level through a certain technical means, at the moment, the native component layer does not exist, and the native component is directly mounted to a WebView node. In the embodiment of this application, the playing interface of the target multimedia content is displayed in the sub-application page of the sub-application, and in the rendering process, the playing interface and the sub-application page are obtained through same-layer rendering.

The design idea of the embodiment of the application is briefly introduced as follows:

With the continuous development of communication technology and the popularization of computer technology, various applications (APPs) enter the daily life of people, and the sub-application serves as a program which can be used immediately only by scanning a two-dimensional code or searching, instead of downloading and installing from the application market. The sub-application has the characteristics of no need of installation and uninstallation, capability of being cleared after being used and no occupation of a mobile phone internal memory, and is widely concerned by all walks of life. At present, sub-applications of APPs are developed in various industries in order to facilitate popularization and seize user flow, and the playing of audio and video in the sub-applications gradually becomes a demand urgently realized by people.

In related art, the audio and video capability of the sub-applications can only be realized through a third-party audio and video editing library. For example, as shown in FIG. 1, the mini program carries an FFmpeg (Fast Forward Mpeg, an open source computer program) or a WebRTC (Web Real-Time Communication) library to realize the audio and video editing capability. Other sub-applications also have similar processing ways. However, introducing of the third-party audio and video editing library into the webpage side will cause large volume of a front-end application package, and the sub-applications generally limit the volume of the package.

Therefore, the embodiment of this application provides the application control method and apparatus, the electronic device, and the storage medium. Specifically, when the operation is performed on the target multimedia content through the sub-application, the object creation instruction is transmitted to the native application, and the object calling instruction is transmitted to the native object after determining the native object created by the native application, wherein the native object is an object used for performing operation on the multimedia content, and therefore the operation on the target multimedia content can be achieved by calling the native object and according to the execution effect. Due to the fact that the capacity of a native system is combined in the embodiment of this application, through the interaction between the sub-application and the native application, the sub-application has very perfect audio and video editing capability, including basic audio and video editing capability. Moreover, in the embodiment of this application, the third-party audio and video editing library does not need to be introduced, and no package volume increment exists, so that the sub-application has the same good performance as the native application; and compared with the prior art, the sub-application has a smaller package volume, and thus the audio and video application is easier to realize and implement.

The following describes the exemplary embodiments of the application with reference to the accompanying drawings of the specification. It is to be understood that the exemplary embodiments described herein are merely used for illustrating and explaining this application, but are not intended to limit this application. In addition, the embodiments of this application and features in the embodiments may be mutually combined in a case of no conflict.

Figure 2:
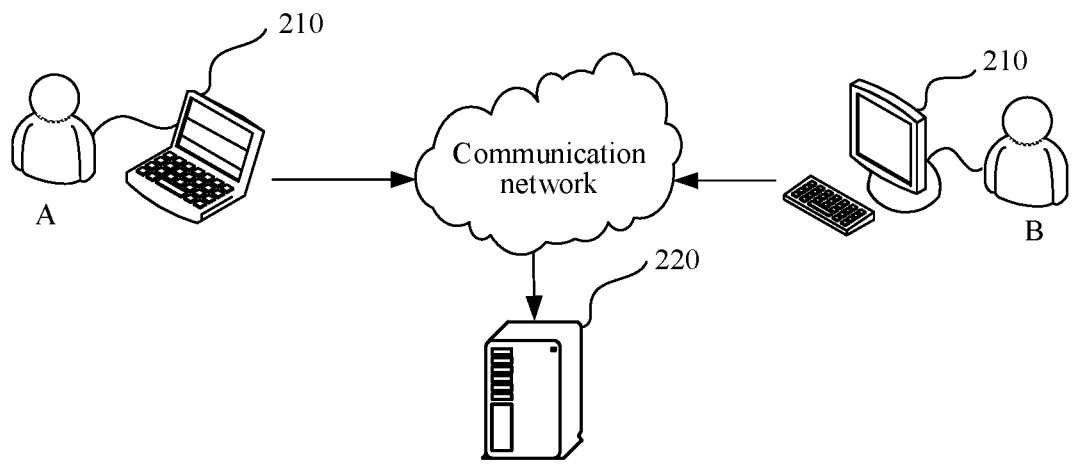
FIG. 2 is a selectable schematic diagram of an application scene in an embodiment of this application.

FIG. 2 is a schematic diagram of an application scenario according to an embodiment of this application. The diagram of the application scenario includes two terminal devices 210 and a server 220. The terminal device 210 may communicate with the server 220 by using a communication network.

In an implementation, the communication network is a wired network or a wireless network. The terminal device 210 and the server 220 may be directly or indirectly connected in a wired or wireless communication manner. This is not limited in this application.

In the embodiment of this application, a terminal device 210 is an electronic device used by a user, and the electronic device can be computing devices such as a personal computer, a mobile phone, a tablet personal computer, a laptop, an electronic book reader and a smart home which have certain computing power and run with instant messaging software and websites or social software and websites. The foregoing server 220 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

Each terminal device 210 can be provided with the native application with multimedia content editing capability, for example, a native application with audio and video editing capability, and a native application with image animation editing capability; and the sub-application is nested in the native application.

The embodiment of this application is mainly illustrated by taking audio and video editing as an example, and the basic audio and video editing capability in the sub-application can be used on various products with audio and video editing requirements. Based on this capacity, the sub-application can realize the functions of: audio and video clipping, speed change, special effects, templates, red packet effects and the like. Common products capable of realizing the audio and video editing capability in the sub-application include: audio and video entertainment applications like adding red packets to published videos through a short video software mini program, enabling the user to get the red packet while browsing the short videos, and providing special effects when the user records the short videos, game software through which the user can play games while live broadcasting and the like through the mini program, tool applications such as picture modification software through which the user can perform basic picture editing through the mini program, office software which can provide the template for the user through the mini program, content publishing applications such as third-party consumption comment software through which the user can upload video and publish evaluation by the mini program, content information applications such as a browser through which the user can carry out audio and video clipping, speed change and the like by a webpage mini program, and social class applications such as instant messaging software through which the user can browse audios and videos by the mini program.

In addition, the mini program listed in the embodiment of this application not only can be nested on the listed terminal APP, but also can be transferred to the Internet automobile, so that one-stop service from travel to life is provided for the user, and a series service scene before getting on the automobile, during driving and after getting off the automobile is realized. Correspondingly, the native application can be a system application, such as a vehicle-mounted application, the user can achieve the functions of audio and video clipping, speed changing, special effects, templates, red packet effects and the like through the vehicle-mounted mini program; and based on achievement of the audio and video editing capability, various intelligent services from travel to life can be provided for the user around a vehicle scene.

Compared with the prior technologies, the application control method in the embodiment of this application combines the JS interaction technology of the WebView, WebView same-layer rendering, a sub-application plug-in mode and an internal memory management mechanism.

Figure 3:
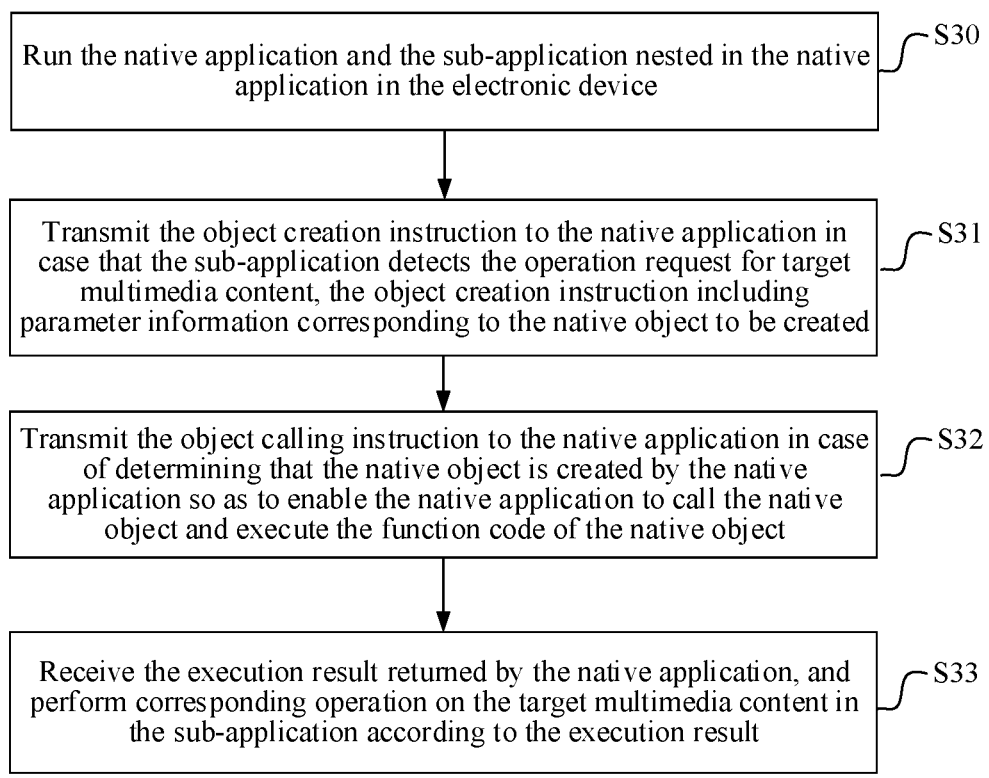
FIG. 3 is a flow schematic diagram of a first type of application control method in an embodiment of this application.

An editing control method in the embodiment of this application is introduced in detail as follows by mainly taking the sub-application serving as the mini program as an example and in conjunction with the accompanying drawings:

FIG. 3 is the flow schematic diagram of the first type of application control method in the embodiment of this application, the method is performed by the electronic device, for example, the terminal device 210 in the FIG. 2. The method is applied to the sub-application, and the specific implementation flow is as follows:

S30: Run the native application and the sub-application nested in the native application in the electronic device.

In the embodiment of this application, the native application is used as the main application, and the sub-application is nested in the native application.

S31: Transmit an object creation instruction to the native application when the sub-application detects an operation request for target multimedia content, the object creation instruction including parameter information corresponding to a native object to be created and enabling the native application to create the native object according to the parameter information, and the native object being used for performing operation on the target multimedia content in the sub-application.

In the embodiment of this application, the operation on the multimedia content includes various editing controls, and can be divided into a plurality of control types, such as clipping, speed change, coding and decoding, sticker, special effect addition and template loading. The native object herein refers to a native object for performing a specific certain type of control on the multimedia content, for example, in response to clipping the target multimedia content, it is needed to create a type of native object A for performing clipping control on the multimedia content; and in response to performing speed change on the target multimedia content, it is needed to create a type of native object B for performing speed change control on the multimedia content, etc.

In response to performing editing control on the target multimedia content through the mini program, it is needed to transmit the object creation instruction to the native application, the parameter information in the instruction specifically refers to the object type, the object class name and the like, thus the native object is indicated to determine the type of editing control to be performed on the multimedia content; and different controls correspond to different audio and video editing capabilities. For example, in response to clipping the audio and video, the corresponding class name is "TAVClip", and in response to coding and decoding the audio and video, the corresponding class name is "TAVPlayer".

After receiving the object creation instruction transmitted by the sub-application, the native application will create a native object according to the parameter information corresponding to the native object to be created in the object creation instruction, and allocate an internal memory to the native object.

In addition, in response to utilizing the basic API provided by the webpage end to realize the audio and video editing capability of the mini program, it is difficult to realize part of the capability or the performance is poor due to the fact that the API of the webpage end on audio and video processing is not perfect enough. According to the embodiment of this application, the capability of the native application is combined, the native API is directly exposed, thus the mini program has the basic audio and video editing capability, the package volume is not increased, and the rendering performance is improved.

In some embodiments, on the native application side, the native application is capable of analyzing the parameter information in the instruction in response to creating the native object according to the parameter information corresponding to the native object to be created in the object creation instruction, and selecting a target API needed to be called for creating the native object from a pre-configured API set according to the analyzed parameter information; and calling the target API to create the native object. APIs in the API set are APIs associated with the audio and video editing capability of the sub-application. The API set in the embodiment of this application mainly refers to an API list, and the list can include the six listed APIs.

For example, in response to clipping the target multimedia content through the mini program, the class name in parameter information can be "TAVClip", and a corresponding target API is the API to be clipped; and in response to coding and decoding the audio and video through the mini program, the class name in the parameter information can be "TAVPlayer", the corresponding target API is the API to be clipped.

It is to be noted that the API related to the audio and video editing capability provided by the native application listed in the embodiment of this application is only illustrated, and in fact, any API related to the audio and video editing capability is suitable for the embodiment of this application and is not specifically limited.

According to the native object internal memory management mechanism, the native object created through interaction of the mini program and the native application has the following problem that if the native object is created, but is not held, the internal memory will be released by the system. The object cannot be found when the mini program transmits a message next time. In order to solve this problem, an object storage method based on a global data dictionary is provided in the embodiment of this application.

In the native layer, the global data dictionary is used for storing the created objects, and as long as the objects created by the mini program are stored in the global dictionary, reference is kept.

S32: Transmit an object calling instruction to the native application in response to determining the native object created by the native application so as to enable the native application to call the native object and execute a function code of the native object.

According to the embodiment of this application, the sub-application is capable of transmitting a JS message containing the object calling instruction to the native application, analyzing the internal memory address and the class name by the native application according to the JS message, then calling the native object, executing the function code of the native object, performing corresponding processing, and returning an execution result to the sub-application.

Specifically, after receiving the JS message, the plug-in the native application is capable of automatically distributing to the target API used for calling the native object to realize simple expansion of a large number of APIs during distribution and improve the audio and video editing control efficiency. It is to be noted that the plug-in the native application specifically refers to plug-ins related to audio and video editing capability, such as coding and decoding, clipping, speed change, stickers, special effects and templates, which are all related to audio and video editing.

S33: Receive an execution result returned by the native application, and perform corresponding operation on the target multimedia content in the sub-application according to the execution result.

For example, the target multimedia content is a video file A, and in response to adjusting the playing speed of the video file A to be 2 times of the speed, the sub-application is capable of performing speed-multiplied playing on the video file A according to the execution result returned by the native application.

According to the embodiment of this application, the sub-application and the native application interact through a browser component in an underlying operating system. In this way, the underlying function of the operating system is effectively utilized, so that the efficiency of data transmission between the sub-application and the native application is higher, and the package volume of the sub-application cannot be increased.

Figure 4:
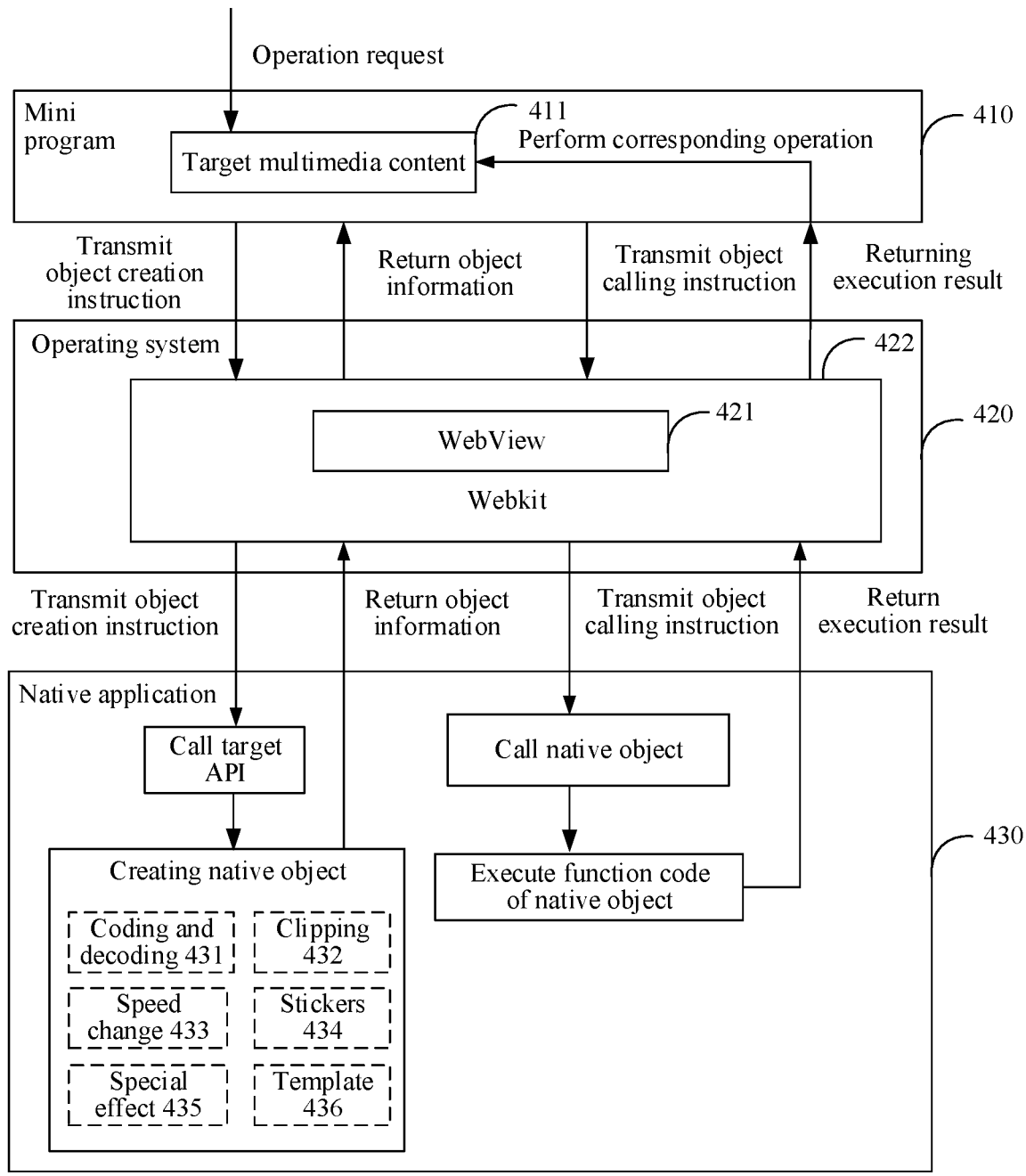
FIG. 4 is a schematic diagram of an interaction flow between a mini program and a native application in an embodiment of this application.

By taking the sub-application serving as the mini program as an example, FIG. 4 is the schematic diagram of the interaction flow between the mini program and the native application in the embodiment of this application, and the sub-application includes a mini program 410, an operating system 420 and a native application 430. The mini program 410 is capable of receiving the operation request of the user on the target multimedia content 411 and giving a response. In the operating system 420, the browser component includes a WebView 421 and a Webkit 422. The WebView 421 is a control for displaying a web page based on the Webkit 422.

For example, when the user taps to open a certain webpage and performs operation on the target multimedia content 411 on the webpage through the mini program 410, an application code of the mini program 410 is loaded to the WebView 421 to run, and at the moment, the mini program 410 will transmit the object creation instruction to the native application 430 through the Webkit 422 according to the received operation request. Specifically, the object creation instruction is transmitted in a form of a JS message.

The native application 430 is capable of analyzing the parameter information in the object creation instruction according to the received JS message, judging which target API is called according to the analyzed parameter information, and then creating the native object. That is, the native objects are in one-to-one correspondence with the parameter information. For example, according to the class name included in the parameter information, the created native object can be any one of a name of coding and decoding 431, a name of clipping 432, a name of speed change 433, a name of sticker 434, a name of special effect 435 and a name of template 436.

After creating the native object by the native application 430, the object information of the native object is returned to the mini program 410 through the Webkit 422, and the object information includes the internal memory address and the class name. Therefore, the mini program 410 is capable of determining the native object created by the native application 430 after receiving the object information, and then transmitting the object calling instruction to the native application 430 through the Webkit 422.

The native application 430 is capable of calling the previously created native object such as a native object with the name of coding and decoding 431 after receiving the object calling instruction, and executing the function code corresponding to the native object. The function code refers to a code required for performing corresponding operation on the target multimedia content, and is indicated through a method name in a data structure of the native object.

After the native application 430 executes the function code corresponding to the native object, the processed data is obtained as the execution result. For example, the operation request is to clip the video, and then the execution result is the duration of the clipped segment.

Finally, the native application 430 is capable of transmitting the execution result to the mini program 410 through the Webkit 422. The mini program 410 directly performs operation on the target multimedia content according to the received execution result, for example, displaying the clipped segment. Therefore, the interaction between the mini program 410 and the native application 430 is achieved.

In the embodiment of this application, three basic interfaces are provided for the mini program based on the interaction process shown in FIG. 4: an object creating interface, an object releasing interface and an object calling interface, and the specific configuration is as follows:

---

Interface 1: object creating interface.
func
tav_creatObject(className:String,methodName:String,param:Param)->
(object:TAVObject);

--- func represents the abbreviation of the function, the function name of the interface is tav_creatObject, className represents the class name, and className:String represents that the class name is of a character string type; methodName represents the method name, and methodName: String represents that the method name is also of a character string type; and param represents the parameter and can specifically include a name (a parameter name) and a value.

For example, an object is created, and the name of the object is TAVObject (audio and video object).

---

Interface 2: object releasing interface.
func tav_raleaseObject(object:TAVObject);
The function name of the interface is tav_raleaseObject.
Interface 3: object calling interface.
func
tav_sendMsgToObject(object:TAVObject,methodName:String,param:
Param).

---

The function name of the interface is tav_sendMsgToObject, object represents the object to be called, TAVObject is the name of the object to be called, methodName:String represents that the method name is also of a character string type; and param represents a parameter.

In the embodiment of this application, through the three basic interfaces and different parameters, the mini program can call various audio and video interfaces of the native layer, and the basic communication between the mini program and the native layer can be met.

Figure 5:
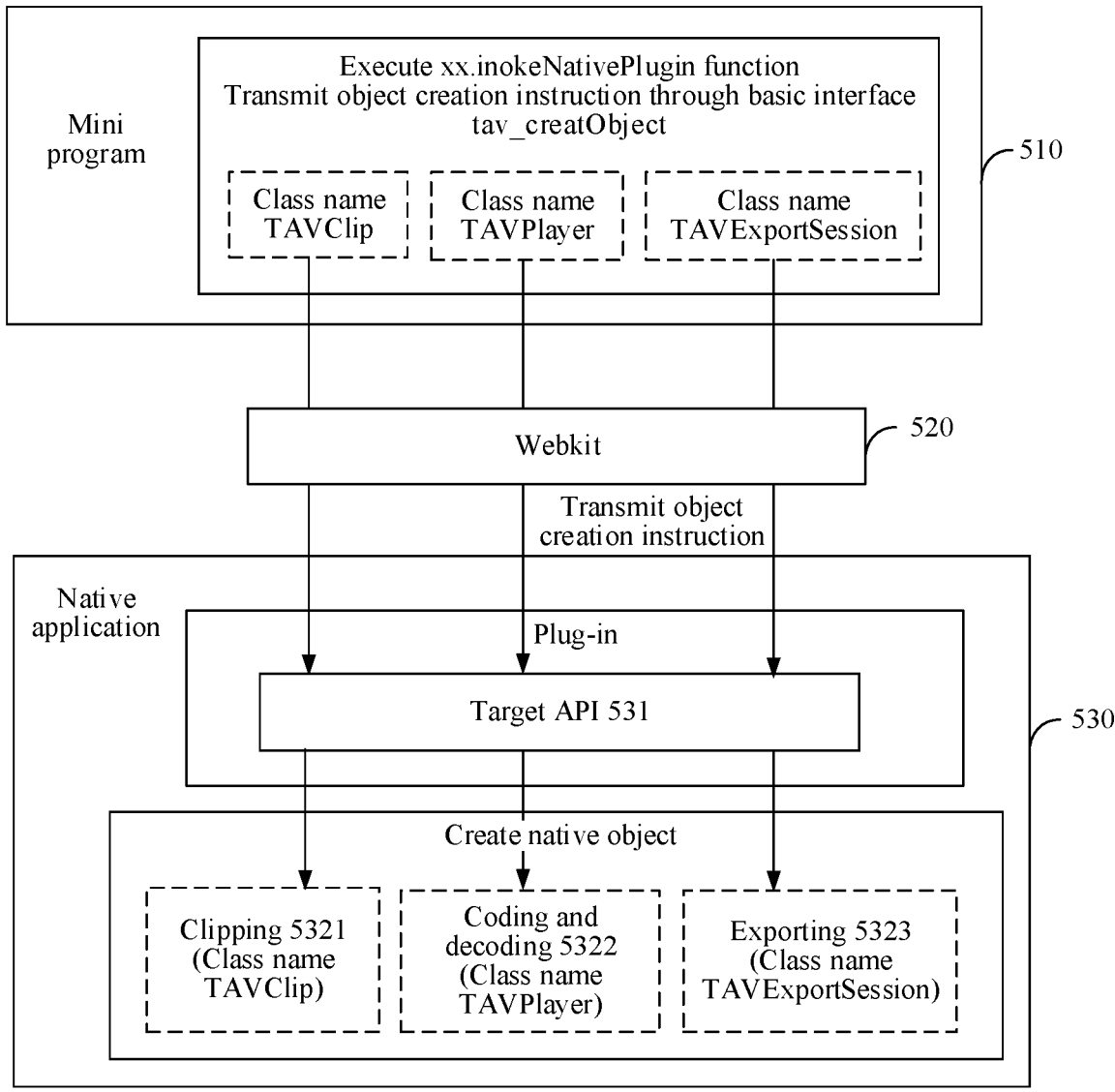
FIG. 5 is a schematic diagram of creating a native object by a plug-in of a native application according to an instruction transmitted by a mini program in an embodiment of this application.

FIG. 5 is the schematic diagram of creating the native object by the plug-in of the native application according to the instruction transmitted by the mini program in the embodiment of this application. The upper half part of the figure refers to the form that a mini program 510 transmits out the object creation instruction. Specifically, the mini program 510 transmits out the object creation instruction by executing a specific function, such as the function xx.inokeNativePlugin, it is used for indicating to call the plug-in in the native application (called as a native plug-in for short) so as to create a native object. Specific codes are as follows:

--- xx.inokeNativePlugin ({   /call native plug-in
  api_name:"tav_creatObject", /interface name:   tav_creatObject (audio video_create object)
  data:{  /data
  "className":"TAVClip",  /class name:  TAVClip (audio and video clipping)
  "methodName":"resource","param":{"resource":  resource}  /method name:  resource (resource) , parameter {resource: resource}
  },
  Success:{ },  /success
  fail:{ }  /fail
})

---

The abovementioned code represents that the object creation instruction is transmitted through a basic interface tav_creatObject of the mini program 510, and the instruction indicates that the class name of the native object is TAVClip and is used for clipping audios and videos; the method name is resource.

The mini program 510 transmits the object creation instruction to a native application 530 through a Webkit 520. Then, the native application 530 distributes the className, the methodName and the param to a corresponding target API 531, and creates a native object with the corresponding class name. For example, the target API 531 is TAVClip (audio and video clipping), the name of the created native object is clipping 5321, and the class name is TAVClip; for example, the target API 531 is TAVPlayer (audio and video coding and decoding), the name of the created native object is coding and decoding 5322, and the class name is TAVPlayer; and for example, the target API 531 is TAVExportSession (audio and video export), the name of the created native object is export 5323, and the class name is TAVExportSession.

In the embodiment of this application, the audio and video editing API is provided by the native application, so that the generated texture pictures are all in the native application.

And the mini program and the native application communicate through the JS message, thus the texture data cannot be transmitted.

In order to solve the problem of rendering the audio and video editing of the native application on the screen, the mini program in the embodiment of this application provides a same-layer rendering technology. That is, the playing interface of the target multimedia content is displayed in the sub-application page of the sub-application, and the playing interface and the sub-application page are obtained through same-layer rendering.

In the embodiment of this application, the core principle of same-layer rendering is to put the view of the native layer into the view level in the WebView, and the view of the native layer can be treated as an html (HyperText Markup Language) tag. This is because the DOM elements can be used for creating the native view according to the tag during rendering the WebView, and the same-layer rendering is to find an appropriate position in the views and then insert the view of the native layer.

Figure 6:
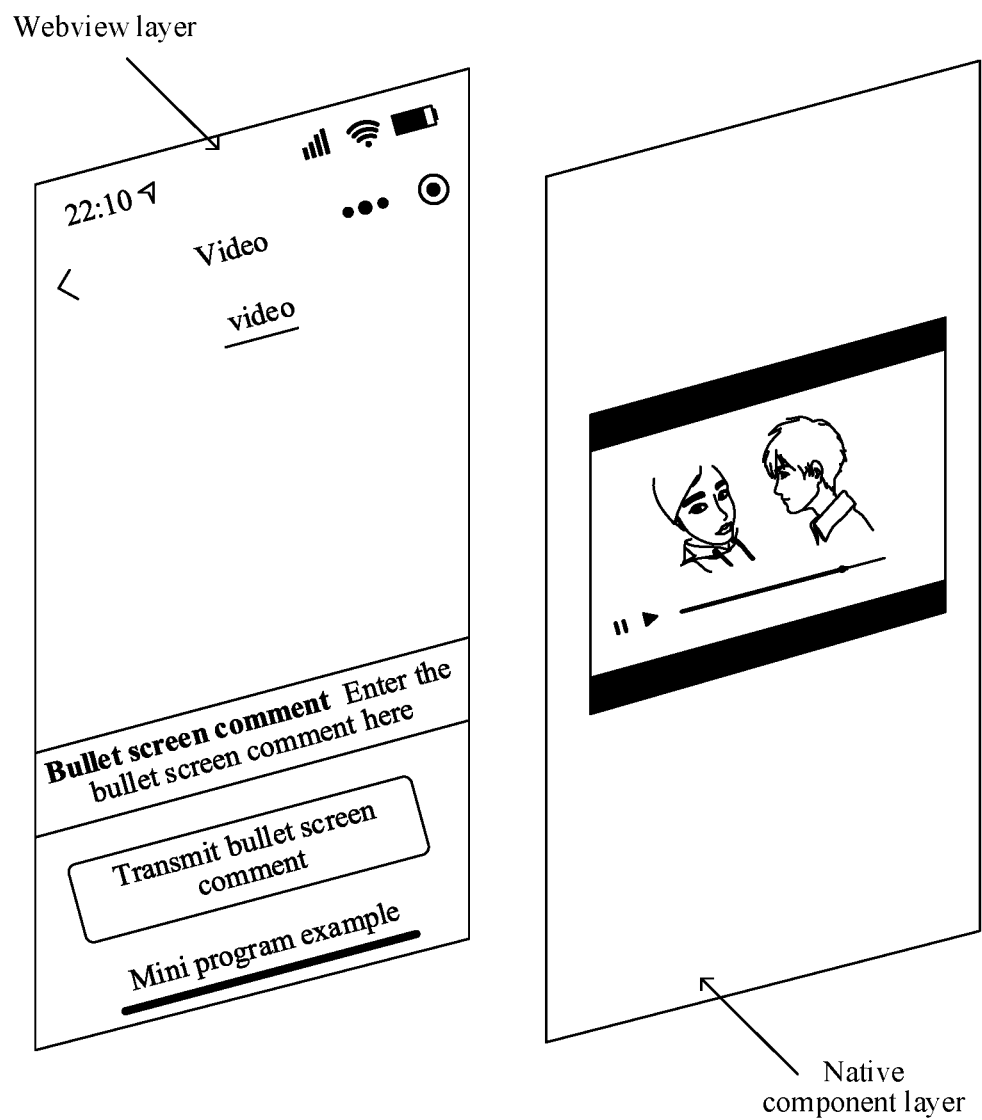
FIG. 6 is an interface level schematic diagram of skipping introducing same-layer rendering in an embodiment of this application.

In related art, the content of the mini program is mostly rendered on the WebView, and if the WebView is regarded as a single level, native components carried by the operating system are located at another higher level. And the two levels are completely independent. FIG. 6 is the interface level schematic diagram of skipping introducing same-layer rendering, the non-native component is located on the WebView layer, and the native component is located on the other higher level. The non-native component layer renders the mini program page, namely the sub-application page. The native component layer renders the playing interface of the target multimedia content.

Figure 7:
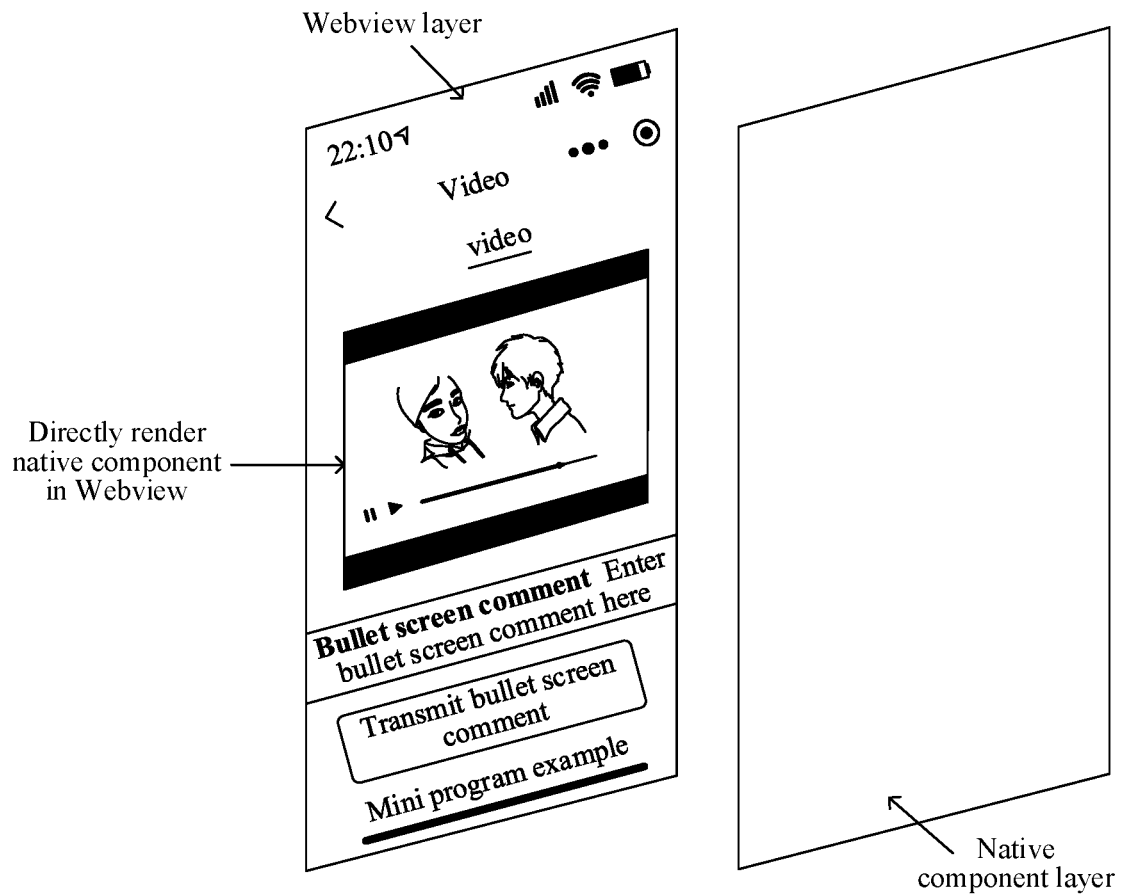
FIG. 7 is an interface level schematic diagram of introducing same-layer rendering in an embodiment of this application.

The same-layer rendering provided in the embodiment of this application refers to directly rendering the native component to the WebView layer through a certain technical means, at the moment, the native component layer does not exist, and the native component is directly mounted on the WebView node. The mini program can almost use the native component rendered on the same layer like using a non-native component. The interface level after the same-layer rendering is enabled is shown in FIG. 7. The picture rendered by the native application is directly rendered to the native view and then nested into the mini program. Therefore, the sub-application page and the playing interface of the target multimedia content are obtained through same-layer rendering.

Figure 8:
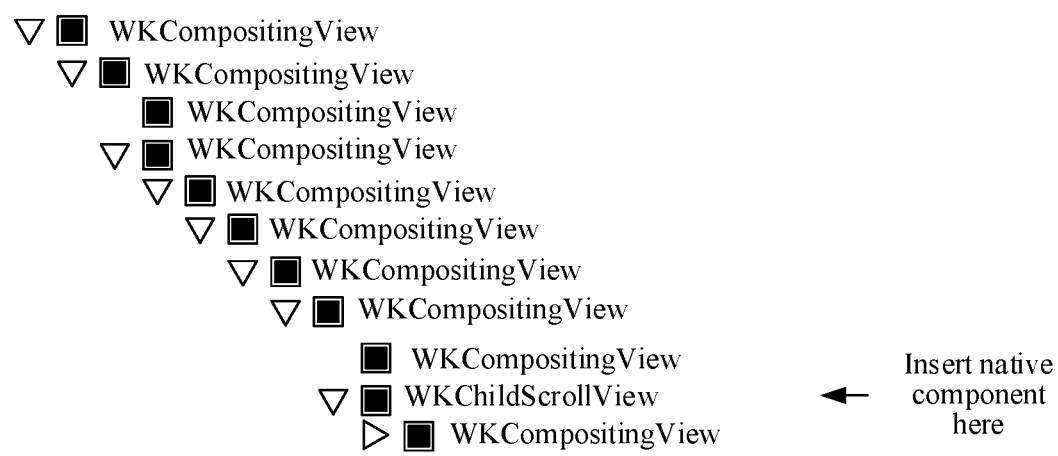
FIG. 8 is a schematic diagram of a WebView node tree in an embodiment of this application.

FIG. 8 is the schematic diagram of the WebView node tree in the embodiment of this application. The WebView is used for rendering and displaying the webpage and can be configured in a user-defined manner. In response to rendering in the mini program with the WebView, the WebView is used for rendering in a layered manner, a CompositingLayer generated by a Webkit kernel is rendered into a WKCompositingView which is a native view of a client, and the kernel renders a plurality of DOM nodes to a synthesis layer, therefore, there is no one-to-one mapping relationship between the synthesis layer and the DOM nodes. In response to setting the attributes of the Cascading Style Sheets (CSS) of the DOM node as overflow: scroll, the WebView will generate a WKChildScrollView for the DOM node, there is a mapping relationship between the WKChildScrollView and the DOM node, and it is a subclass of a native UIScrollView, that is, scroll in the WebView is actually borne by a real native scroll component, so that the WebView scroll brings a smoother experience.

The same-layer rendering of the mini program is also realized based on the WK sub-scroll view. As shown in FIG. 8, the native component is mounted on the WK sub-scroll view node to serve as the sub-view of the WK sub-scroll view node, or, the native component is inserted into the WK sub-scroll view node to realize same-layer rendering; in this way, the layer problem of the native component is solved, meanwhile, the native component has richer display and interaction capacity; and when the mini program renders the playing interface, the native component on the same layer can be directly used, thus the rendering processing complexity is reduced, and the rendering processing efficiency is improved.

In an implementation mode, the specific implementation process of step S32 includes:

S321: determining the native object created by the native application during receiving the object information of the native object returned by the native application; and S322: transmitting the object calling instruction to the native application according to the object information.

Therefore, the native object is created through the native application and then is called by the sub-application, so that very perfect audio and video basic capability is provided for the sub-application, meanwhile, no package volume increment exists, and the sub-application can have the same performance as the native application.

In response to storing the previously created object by the global data dictionary, there is still a problem that the object cannot be found under some conditions. For example, although the created objects are all stored in the global data dictionary, if the object attributes obtained from the objects through the get method are not in the dictionary, the problem that the objects cannot be found occurs. And if the user performs dictionary storage once when calling by using the get method, it can be ensured that the object can be found, but the implementation complexity of the API can be increased.

In the embodiment of this application, a better method for solving the problem is provided, and due to the fact that the object obtained through the get method actually exists in the system internal memory all the time, and there is a reference relationship, an instance object can be dynamically obtained as long as the internal memory address and the class name of the object are provided.

In some embodiments, after the native object is created by the native application, the address of the internal memory allocated to the native object, the class name of the native object and other information are taken as the object information, and the internal memory address and the class name are provided in the data structure of the object returned by the mini program, wherein the internal memory address refers to the address of the internal memory allocated to the native object by the native application, and the class name refers to the type of the native object. After the object information is received by the mini program, that the native object is created by the native application can be determined. When the mini program calls the object method, the internal memory address and the class name are treated as object data, added to the object calling instruction and transmitted back to the native layer of the native application, and the native layer dynamically creates the object instance through the pointer, thus the calling of the native object is achieved; and a method indicated in the native object data structure is executed, namely, the function code is executed.

The specific process is that: when the mini program calls the native object, the content address and the class name are added into the object calling instruction, and the object calling instruction is transmitted to the native application; after the native application receives the object calling instruction containing the content address and the class name, the internal memory allocated to the native object is determined according to the internal memory address, and the type of the native object is determined according to the class name; and after the internal memory allocated to the native object is indexed through the pointer, the native object is called according to the type of the native object.

The mode of adding the content address and the class name into the object calling instruction is on the basis that the native object always exists in the system internal memory and has a certain reference relationship, so that the native object can be dynamically obtained by representing the reference relationship through the content address and the class name, and the processing efficiency of obtaining the object during interacting between the mini program and the native application is improved.

Figure 9:
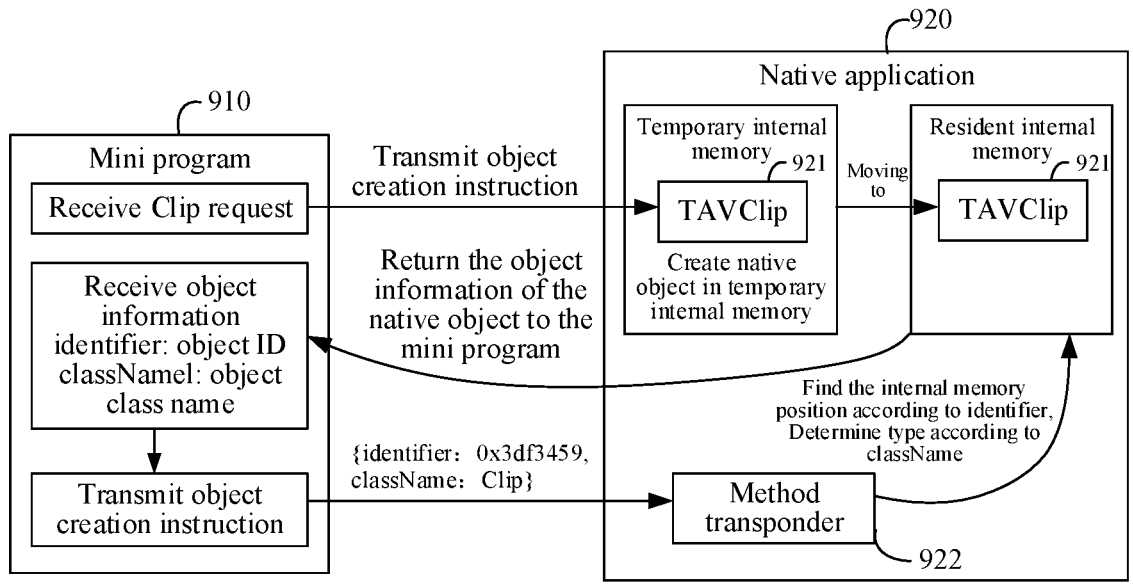
FIG. 9 is a schematic diagram of storing a native object by a native application in an embodiment of this application.

FIG. 9 is the schematic diagram of storing the native object by the native application in the embodiment of this application. When a mini program 910 receives a Clip request for target multimedia content, the object creation instruction is transmitted to a native application 920; and after the native application 920 receives the instruction, a native object 921 with the name of clipping and the class name of TAVClip is created in a temporary internal memory. And then, the internal memory of the native object 921 is moved to a resident internal memory (namely object is stored in the global data dictionary), so that the mini program 910 can access the object.

Then, object information of the native object of the native application 920 is returned to the mini program 910, and the object information specifically includes an identifier (object ID) and a className (object class name). In case that the mini program 910 calls the native object to execute the Clip method, the identifier and the className are added to the object calling instruction, and the object calling instruction is transmitted to a method transponder 922 of the native application 920. For example, in FIG. 9, the object calling instruction includes the identifier and the className, wherein the identifier is 0x3df3459, representing that the internal memory address of the native object is 0x3df3459, and the className is Clip. After the native application 920 receives the information, the internal memory position will be found according to the identifier based on the method transponder 922, the type will be determined according to the className, then the internal memory 921 allocated to the native object will be indexed through the pointer, and finally, the method of the native object will be called according to the type of the native object, namely the function code of the native object is executed.

According to the embodiment, the instance object can be dynamically obtained as long as the internal memory address and the class name of the native object are provided, so that the problem that the object cannot be found due to the fact that the object attribute obtained through the get method is not in the dictionary is solved.

In some embodiments, the mini program can transmit the object release instruction for the native object to the native application after completing the operation on the target multimedia content. After receiving the object release instruction for the native object, the native application releases the internal memory allocated to the native object before.

Specifically, the mini program can release the object resource by calling the release message. For example, the target multimedia content is a video file A; after the video file A is clipped, namely the editing control on the target multimedia content is finished, at the moment, the release message that is the object release instruction for the native object TAVClip can be transmitted to the native application, wherein the instruction can include the internal memory address, the class name, the object id and other information of the native object; and after the native application receives the release message, the internal memory previously allocated to the native object can be released through a corresponding API. In addition, under the condition of exiting the mini program or other conditions, plug-in destruction can be carried out, and the native layer can automatically clean all related native objects.

In the embodiment, when the mini program completes certain editing control on the target multimedia content, the object release instruction for the native object used for the editing control can be transmitted to the native application, and the native object releases the corresponding internal memory to avoid internal memory overflow, so that enough continuous internal memory space is provided for subsequent use.

Figure 10:
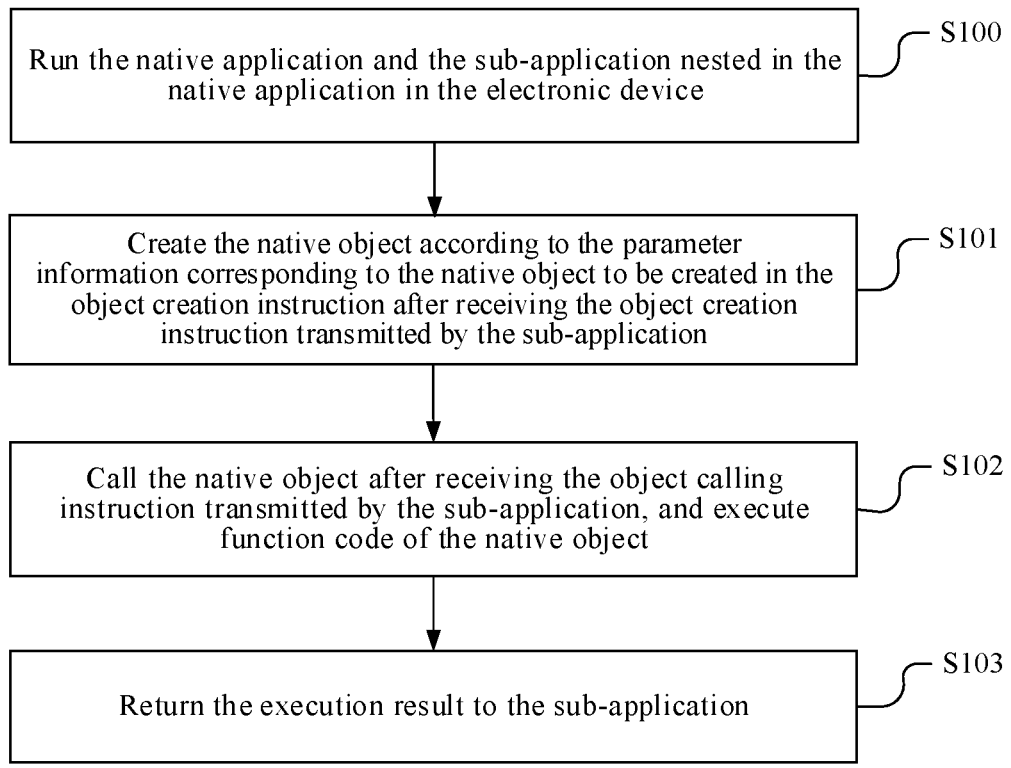
FIG. 10 is a flow schematic diagram of a second type of application control method in an embodiment of this application.

Based on the same inventive concept, the embodiment of this application further provides an application control method which is applied to the native application. FIG. 10 is the flow schematic diagram of the second type of application control method in the embodiment of this application, the method is performed by the electronic device, such as the terminal device 210 in FIG. 2, and is applied to the native application. The specific implementation flow is as follows:

S100: running the native application and the sub-application nested in the native application in the electronic device.

S101: creating the native object according to the parameter information corresponding to the native object to be created in the object creation instruction after receiving the object creation instruction transmitted by the sub-application, the object creation instruction being transmitted during the sub-application detects the operation request for the target multimedia content, and the native object being used for performing operation on the target multimedia content in the sub-application;

S102: calling the native object after receiving the object calling instruction transmitted by the sub-application, and executing the function code of the native object, the object calling instruction being transmitted during the sub-application determines that the native object is created by the native application; and S103: returning the execution result to the sub-application, and performing corresponding operation on the target multimedia content through the sub-application according to the execution result.

In some embodiments, after creating the native object and before receiving the object calling instruction transmitted by the sub-application, the method further includes:
  returning the object information obtained by creating the native object to the sub-application, determining the native object created by the native application through the sub-application during receiving the object information, and transmitting the object calling instruction according to the object information.

In some embodiments, creating the native object according to the parameter information corresponding to the native object to be created in the object creation instruction specifically includes:
  analyzing the parameter information in the object creation instruction, and selecting a target API to be called to create the native object from a pre-configured API set, APIs in the API set being APIs associated with the audio and video editing capability of the sub-application; and calling the target API to create the native object.

In the abovementioned way, the API associated with the audio and video editing capability of the sub-application is called through the native application to create the native object, so that the sub-application has certain audio and video editing capability, the third-party audio and video editing library is prevented from being added into the sub-application, for example, an FFmpeg or WebRTC library is carried in the mini program, and from this perspective, the package volume of the sub-application with the audio and video editing capability is reduced.

In some embodiments, the object information includes the internal memory address and the class name; the object calling instruction carries the internal memory address and the class name; the internal memory address refers to the address of the internal memory allocated by the native application for the native object, and the class name refers to the type of the native object.

Calling the native object after receiving the object calling instruction transmitted by the sub-application specifically includes:

determining the internal memory allocated to the native object according to the internal memory address, and determining the type of the native object according to the class name; and indexing the internal memory allocated to the native object through the pointer, and calling the native object according to the type of the native object.

In some embodiments, after creating the native object according to the parameter information corresponding to the native object to be created in the object creation instruction, the method further includes:

storing the native object by the global data dictionary so as to keep the calling of the sub-application to the native object.

Storage is carried out through the global data dictionary, so that the native object can be stored in the internal memory all the time, it can be guaranteed that the sub-application can access the native object, and then the basic audio and video editing capability can be obtained.

In some embodiments, the method further includes:

releasing the internal memory allocated for the native object after receiving the object release instruction transmitted by the sub-application for the native object, the object release instruction being transmitted by the sub-application after the sub-application completes the operation for target multimedia content.

Figure 11:
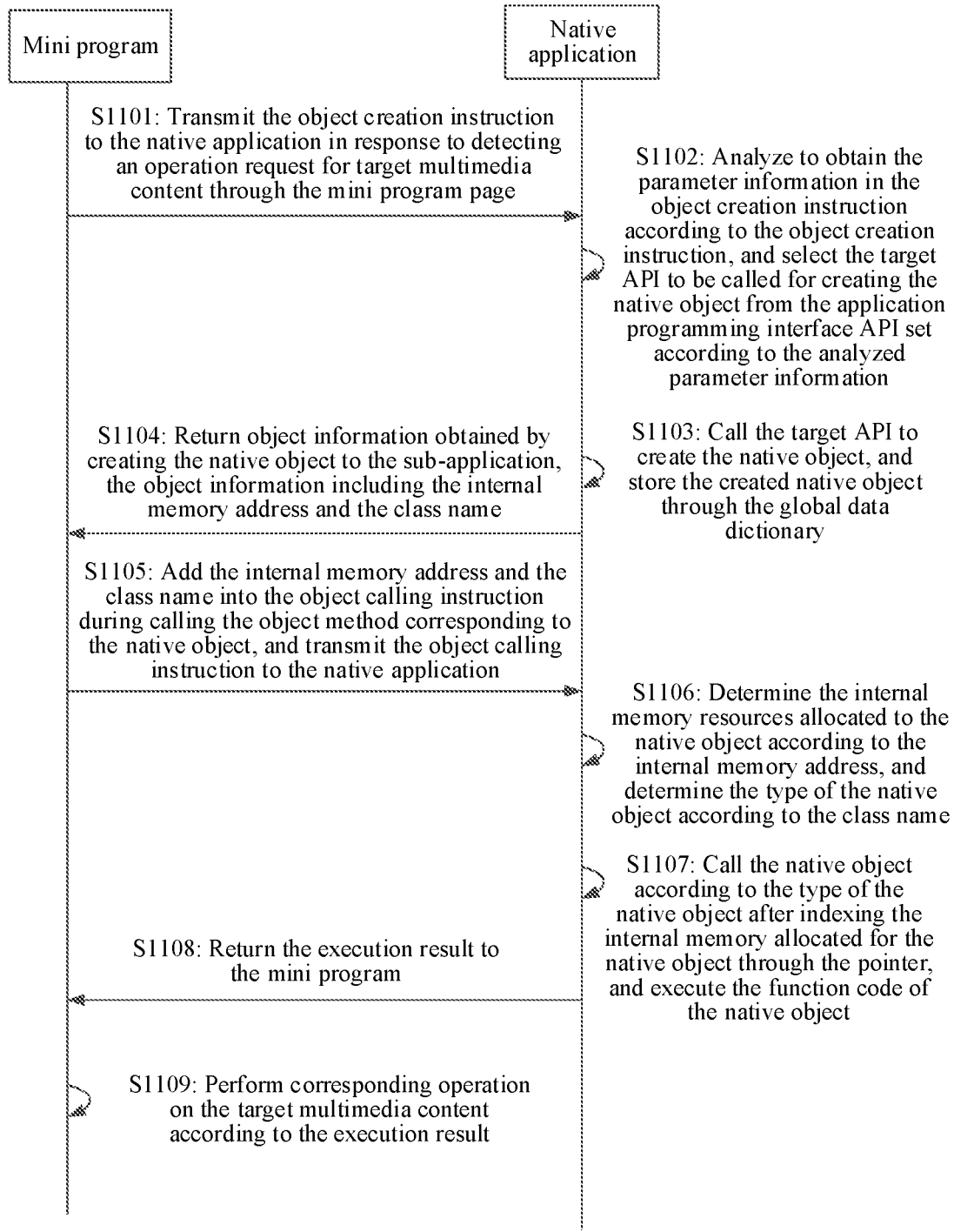
FIG. 11 is a flow schematic diagram of selectable interaction realization time sequence in an embodiment of this application.

FIG. 11 is the interaction time sequence diagram of the application control method. The method includes the following specific implementation processes:

S1101: transmitting the object creation instruction to the native application through the mini program in response to detecting the operation request for target multimedia content through the mini program page;

S1102: analyzing to obtain the parameter information in the object creation instruction according to the object creation instruction through the native application, and selecting the target API to be called for creating the native object from the API set according to the analyzed parameter information;

S1103: calling the target API to create the native object through the native application, and storing the created native object through the global data dictionary;

S1104: returning object information obtained by creating the native object to the sub-application through the native application, the object information including the internal memory address and the class name;

S1105: adding the internal memory address and the class name into the object calling instruction through the mini program during calling the native object, and transmitting the object calling instruction to the native application;

S1106: determining the internal memory resources allocated to the native object through the native application according to the internal memory address, and determining the type of the native object according to the class name;

S1107: calling the native object according to the type of the native object after indexing the internal memory allocated for the native object through the pointer, and executing the function code of the native object to carry out corresponding data processing on the target multimedia content;

S1108: returning the execution result to the mini program through the native application; and S1109: performing corresponding operation on the target multimedia content according to the execution result through the mini program.

Figure 12:
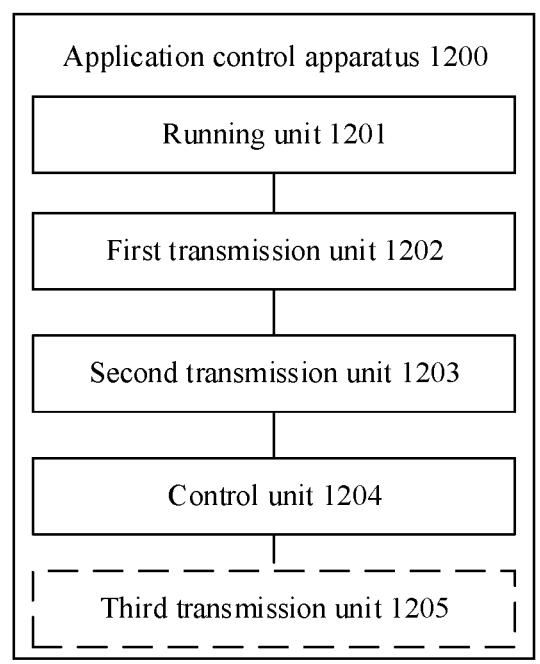
FIG. 12 is a schematic diagram of a composition structure of a first type of application control apparatus in an embodiment of this application.

Based on the same inventive concept, the embodiment of this application further provides an application control apparatus. FIG. 12 is the schematic diagram of the composition structure of the first type of application control apparatus 1200 in the embodiment of this application, the apparatus is applied to the sub-application and includes:

a running unit 1201 for running the native application and the sub-application nested in the native application in the electronic device;

a first transmission unit 1202 for transmitting the object creation instruction to the native application when the sub-application detects the operation request for target multimedia content, the object creation instruction including parameter information corresponding to the native object to be created and enabling the native application to create the native object according to the parameter information, and the native object being used for performing operation on the target multimedia content in the sub-application;

a second transmission unit 1203 for transmitting the object calling instruction to the native application in response to determining the native object created by the native application so as to enable the native application to call the native object and execute the function code of the native object; and a control unit 1204 for receiving the execution result returned by the native application, and performing corresponding operation on the target multimedia content according to the execution result.

In some embodiments, the second transmission unit 1203 is specifically configured to perform the functions of:

determining the native object created by the native application during receiving the object information of the native object returned by the native application; and transmitting the object calling instruction to the native application according to the object information.

In some embodiments, the object information includes the internal memory address and class name; and the second transmission unit 1203 is specifically configured to perform the functions of:

adding the internal memory address and the class name into the object calling instruction during calling the native object; transmitting the object calling instruction to the native application; determining the internal memory allocated to the native object by the native application according to the internal memory address, and determining the type of the native object according to the class name; indexing the internal memory allocated to the native object through the pointer; and calling the native object according to the type of the native object.

In some embodiments, the playing interface of the target multimedia content is displayed in the sub-application page of the sub-application, and the playing interface corresponding to the target multimedia content and the sub-application page are obtained through same-layer rendering.

In some embodiments, the apparatus further includes:
a third transmission unit 1205 for transmitting the object release instruction for the native object to the native application after the sub-application completes the operation on the target multimedia content so as to enable the native application to release the internal memory allocated to the native object.

In some embodiments, the sub-application and the native application interact through the browser component.

Figure 13:
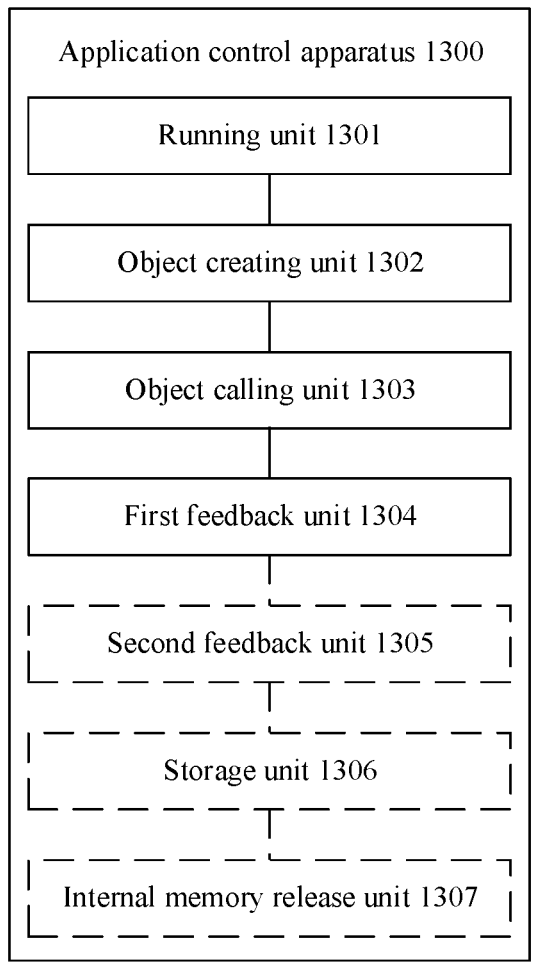
FIG. 13 is a schematic diagram of a composition structure of a second type of application control apparatus in an embodiment of this application.

Based on the same inventive concept, the embodiment of this application further provides an application control apparatus. FIG. 13 is the structural schematic diagram of an application program control apparatus 1300 provided by the embodiment of this application, the apparatus is applied to the native application and can include:
a running unit 1301 for running the native application and the sub-application nested in the native application in the electronic device;
an object creating unit 1302 for creating the native object according to the parameter information corresponding to the native object to be created in the object creation instruction after receiving the object creation instruction transmitted by the sub-application, the object creation instruction being transmitted during the sub-application detects the operation request for the target multimedia content, and the native object being used for performing operation on the target multimedia content in the sub-application;
an object calling unit 1303 for calling the native object after receiving the object calling instruction transmitted by the sub-application, and executing the function code of the native object, the object calling instruction being transmitted during the sub-application determines that the native object is created by the native application;
a first feedback unit 1304 for returning the execution result to the sub-application, and performing corresponding operation on the target multimedia content through the sub-application according to the execution result.

In some embodiments, the apparatus further includes:
a second feedback unit 1305 for returning the object information obtained by creating the native object to the sub-application, determining the native object created by the native application through the sub-application during receiving the object information, and transmitting the object calling instruction according to the object information after the native object is created by the object creating unit 1302 and before the object calling unit 1303 receives the object calling instruction transmitted by the sub-application.

In some embodiments, the object creating unit 1302 is specifically configured to perform the functions of:
analyzing the parameter information in the object creation instruction, and selecting a target API to be called to create the native object from a pre-configured API set, APIs in the API set being APIs associated with the audio and video editing capability of the sub-application; and
calling the target API to create the native object.

In some embodiments, the object information includes the internal memory address and the class name; the object calling instruction carries the internal memory address and the class name; and the object calling unit 1303 is specifically configured to perform the functions of:
determining the internal memory allocated to the native object according to the internal memory address, and determining the type of the native object according to the class name; and
indexing the internal memory allocated to the native object through the pointer, and calling the native object according to the type of the native object.

In some embodiments, the apparatus further includes:
a storage unit 1306 for storing the native object by the global data dictionary so as to keep the calling of the sub-application to the native object after creating the native object through the object creating unit 1302 according to the parameter information corresponding to the native object to be created in the object creation instruction.

In some embodiments, the apparatus further includes:
an internal memory release unit 1307 for releasing the internal memory allocated to the native object after receiving the object release instruction for the native object transmitted by the sub-application, the object release instruction being transmitted by the sub-application after completing the operation on the target multimedia content.

For ease of description, the foregoing components are respectively described as various modules (or units) divided according to functions. Certainly, during the implementation of this application, the function of the various modules (or units) may be implemented in a same piece of or multiple pieces of software or hardware.

After the application control method and apparatus of exemplary implementations of this application are described, the following describes an electronic device according to another exemplary implementation of this application.

A person skilled in the art can understand that various aspects of this application may be implemented as systems, methods, or computer program products. Therefore, the aspects of this application may be specifically embodied in the following forms: hardware only implementations, software only implementations (including firmware, micro code, etc.), or implementations with a combination of software and hardware, which are collectively referred to as "circuit", "module", or "system" herein.

Based on the same inventive concept as the above embodiment of the method, and the embodiment of this application further provides an electronic device. The electronic device can be used for transfer control of resource objects. In one embodiment, the electronic device can be a server, such as a server 220 shown in FIG. 2, and can also be a terminal device, such as the terminal device 210 shown in FIG. 2. In the embodiment, the structure of the electronic device can be shown in FIG. 14, and the electronic device includes a memory 1401, a communication module 1403 and one or more processors 1402.

The memory 1401 is configured to store a computer program executed by the processor 1402. The memory 1401 may mainly include a program storage area and a data storage area. The program storage area may store an operating system, a program required for running an instant messaging function, and the like. The storage data area is configured to store various instant messaging information, operation instruction sets and the like.

The memory 1401 may be a volatile memory such as a random-access memory (RAM); the memory 1401 may be a non-volatile memory such as a read-only memory, a flash memory, a hard disk drive (HDD) or a solid-state drive (SSD); or the memory 1401 is any other medium that can be used to carry or store expected program code that has an instruction or data structure form, and that can be accessed by a computer, but is not limited thereto. The memory 1401 may be a combination of the foregoing memories.

The processor 1402 may include one or more central processing units (CPUs), or may be a digital processing unit, or the like. The processor 1402 is configured to invoke the computer program stored in the memory 1401, to perform the foregoing application control method.

The communications module 1403 is configured to communicate with a terminal device and an other server.

Figure 14:
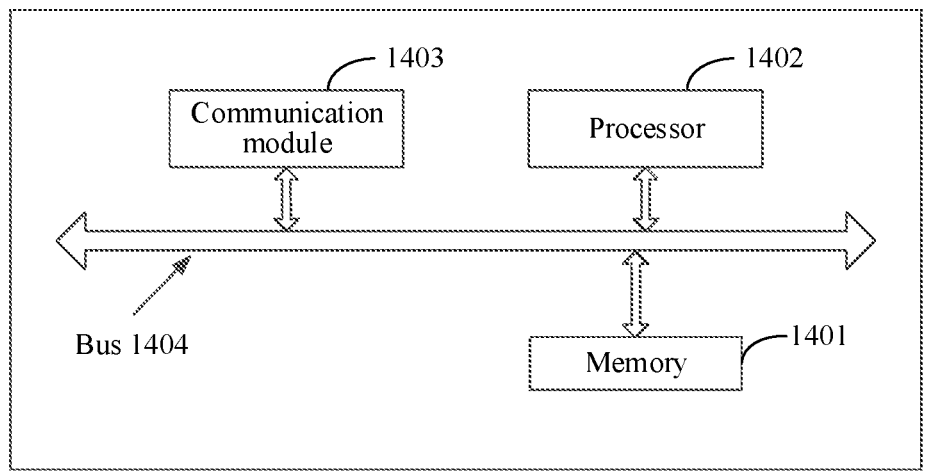
FIG. 14 is a schematic diagram of a composition structure of hardware of an electronic device according to an embodiment of this application.

In this embodiment of this application, a specific connection medium between the memory 1401, the communication module 1403, and the processor 1402 is not limited. In this embodiment of this application, in FIG. 14, the memory 1401 and the processor 1402 are connected to each other through a bus 1404. The bus 1404 is represented by using a bold line in FIG. 14. A manner of connection between other components is only schematically described, but is not used as a limitation. The bus 1404 may be classified into an address bus, a data bus, a control bus, and the like. For ease of description, the bus in FIG. 14 is represented by using only one bold line, but this does not indicate that there is only one bus or one type of bus.

The memory 1401 stores a computer storage medium. The computer storage medium stores a computer-executable instruction. The computer-executable instruction is used for implementing the application control method according to the embodiments of this application. The processor 1402 is configured to execute the application control method, as shown in FIG. 3 or FIG. 10.

In some possible implementations, each aspect of the application control method provided in this application may be further implemented in a form of a program product including program code. When the program product is run on a computer device, the program code is used to enable the computer device to perform steps of the application control method according to the various exemplary implementations of this application described above in the specification. For example, the computer device can perform the steps shown in FIG. 3 or FIG. 10.

The program product may adopt one readable medium or any combination of readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (non-exhaustive list) of the readable storage medium include an electrical connection having one or more wires, a portable disk, a hard disk, a random access memory (RAM), a read-only memory (ROM), an erasable programmable read only memory (EPROM or a flash memory), an optical fiber, a portable compact disk read-only memory (CD-ROM), an optical storage device, a magnetic storage device, or any suitable combination thereof.

The program product according to an implementation of this application may use a CD-ROM, include program code, and may be run on a computing apparatus. However, the program product of this application is not limited to this. In this specification, the readable storage medium may be any tangible medium including or storing a program, and the program may be used by or in combination with a command execution system, an apparatus, or a device.

The readable signal medium may include a data signal propagated in baseband or propagated as a part of a carrier, and readable program code is carried therein. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with a command execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

A person of ordinary skill in the art may understand that all or some steps for implementing the foregoing method embodiment may be completed by a program instructing related hardware, the foregoing program may be stored in a computer readable storage medium, and when being executed, the program performs steps including the foregoing method embodiment. The storage medium includes: any medium that can store program code, such as a removable storage device, a read-only memory (ROM), a random access memory (RAM), a magnetic disk, or an optical disc.

Alternatively, when the integrated module in the embodiments of this application is implemented in the form of a software function module and sold or used as an independent product, the integrated module may be stored in a computer readable storage medium. Based on such an understanding, the technical solutions of the embodiments of this application essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of this application. The storage medium includes: any medium that can store program code, such as a mobile storage device, a ROM, a magnetic disk, or an optical disc.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. An application control method performed by an electronic device that runs a native application and a sub-application nested in the native application, the method comprising:
   receiving, by the native application, an object creation instruction transmitted by the sub-application;
   in response to the object creation instruction, creating, by the native application, a native object, wherein the native object is configured for performing operation on target multimedia content in the sub-application;
   receiving, by the native application, an object calling instruction transmitted by the sub-application; and
   in response to the object calling instruction, executing, by the native application, the native object and returning an execution result of the native project to the sub-application, wherein the sub-application is configured for performing corresponding operation on target multimedia content according to the execution result;
   wherein the creating, by the native application, a native object comprises:
      selecting a target API to be called to create the native object from a pre-configured application programming interface API set, wherein APIs in the API set are associated with audio and video editing capability of the sub-application; and
      calling the target API to create the native object.

2. The method according to claim 1, wherein after creating the native object and before receiving the object calling instruction transmitted by the sub-application, the method further comprises:
   returning, by the native application, object information obtained by creating the native object to the sub-application;
   determining, by the sub-application, the native object created by the native application based on the object information; and
   transmitting the object calling instruction according to the object information.

3. The method according to claim 2, wherein the object information comprises the internal memory address and the class name; the object calling instruction carries the internal memory address and the class name;
   the executing, by the native application, the native object comprises:
   determining the internal memory allocated to the native object according to the internal memory address, and determining the type of the native object according to the class name; and
   indexing the internal memory allocated to the native object through the pointer, and calling the native object according to the type of the native object.

4. The method according to claim 1, wherein after creating the native object, the method further comprises:
   storing the native object by a global data dictionary so as to keep the calling of the sub-application to the native object.

5. The method according to claim 1, wherein the sub-application transmits the object creation instruction after detecting an operation request for the target multimedia content.

6. The method according to claim 1, wherein the sub-application transmits the object calling instruction after determining that the native object is created by the native application.

7. An electronic device that runs a native application and a sub-application nested in the native application, comprising a processor and a memory, the memory storing program code, the program code, when executed by the processor, causing the electronic device to perform an application control method including:
   receiving, by the native application, an object creation instruction transmitted by the sub-application;
   in response to the object creation instruction, creating, by the native application, a native object, wherein the native object is configured for performing operation on target multimedia content in the sub-application;
   receiving, by the native application, an object calling instruction transmitted by the sub-application; and
   in response to the object calling instruction, executing, by the native application, the native object and returning an execution result of the native project to the sub-application, wherein the sub-application is configured for performing corresponding operation on target multimedia content according to the execution result;
   wherein the creating, by the native application, a native object comprises:
      selecting a target API to be called to create the native object from a pre-configured application programming interface API set, wherein APIs in the API set are associated with audio and video editing capability of the sub-application; and
      calling the target API to create the native object.

8. The electronic device according to claim 7, wherein after creating the native object and before receiving the object calling instruction transmitted by the sub-application, the method further comprises:
   returning, by the native application, object information obtained by creating the native object to the sub-application;
   determining, by the sub-application, the native object created by the native application based on the object information; and
   transmitting the object calling instruction according to the object information.

9. The electronic device according to claim 8, wherein the object information comprises the internal memory address and the class name; the object calling instruction carries the internal memory address and the class name;
   the executing, by the native application, the native object comprises:
   determining the internal memory allocated to the native object according to the internal memory address, and determining the type of the native object according to the class name; and
   indexing the internal memory allocated to the native object through the pointer, and calling the native object according to the type of the native object.

10. The electronic device according to claim 7, wherein after creating the native object, the method further comprises:
   storing the native object by a global data dictionary so as to keep the calling of the sub-application to the native object.

11. The electronic device according to claim 7, wherein the sub-application transmits the object creation instruction after detecting an operation request for the target multimedia content.

12. The electronic device according to claim 7, wherein the sub-application transmits the object calling instruction after determining that the native object is created by the native application.

13. A non-transitory computer-readable storage medium, comprising program code, the program code, when executed by a processor of an electronic device that runs a native application and a sub-application nested in the native application, causing the electronic device to perform an application control method including:
    receiving, by the native application, an object creation instruction transmitted by the sub-application;
    in response to the object creation instruction, creating, by the native application, a native object, wherein the native object is configured for performing operation on target multimedia content in the sub-application;
    receiving, by the native application, an object calling instruction transmitted by the sub-application; and
    in response to the object calling instruction, executing, by the native application, the native object and returning an execution result of the native project to the sub-application, wherein the sub-application is configured for performing corresponding operation on target multimedia content according to the execution result;
    wherein the creating, by the native application, a native object comprises:
        selecting a target API to be called to create the native object from a pre-configured application programming interface API set, wherein APIs in the API set are associated with audio and video editing capability of the sub-application; and
        calling the target API to create the native object.

14. The non-transitory computer-readable storage medium according to claim 13, wherein after creating the native object and before receiving the object calling instruction transmitted by the sub-application, the method further comprises:
    returning, by the native application, object information obtained by creating the native object to the sub-application;
    determining, by the sub-application, the native object created by the native application based on the object information; and
    transmitting the object calling instruction according to the object information.

15. The non-transitory computer-readable storage medium according to claim 14, wherein the object information comprises the internal memory address and the class name; the object calling instruction carries the internal memory address and the class name;
    the executing, by the native application, the native object comprises:
        determining the internal memory allocated to the native object according to the internal memory address, and determining the type of the native object according to the class name; and
        indexing the internal memory allocated to the native object through the pointer, and calling the native object according to the type of the native object.

16. The non-transitory computer-readable storage medium according to claim 13, wherein after creating the native object, the method further comprises:
    storing the native object by a global data dictionary so as to keep the calling of the sub-application to the native object.

17. The non-transitory computer-readable storage medium according to claim 13, wherein the sub-application transmits the object creation instruction after detecting an operation request for the target multimedia content.

* * * * *